United States Patent
Jeon et al.

(10) Patent No.: US 12,335,485 B2
(45) Date of Patent: Jun. 17, 2025

(54) VIDEO ENCODING AND DECODING METHOD USING ADAPTIVE REFERENCE PIXEL SELECTION

(71) Applicants: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

(72) Inventors: Byeung Woo Jeon, Seongnam-si (KR); Jee Yoon Park, Seoul (KR); Bum Yoon Kim, Yongin-si (KR); Seung Wook Park, Yongin-si (KR)

(73) Assignees: HYUNDAI MOTOR COMPANY, Seoul (KR); KIA CORPORATION, Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 64 days.

(21) Appl. No.: 18/037,961

(22) PCT Filed: Nov. 23, 2021

(86) PCT No.: PCT/KR2021/017286
§ 371 (c)(1),
(2) Date: May 19, 2023

(87) PCT Pub. No.: WO2022/108422
PCT Pub. Date: May 27, 2022

(65) Prior Publication Data
US 2024/0007645 A1    Jan. 4, 2024

(30) Foreign Application Priority Data

Nov. 23, 2020 (KR) .................. 10-2020-0157795
Nov. 23, 2021 (KR) .................. 10-2021-0161975

(51) Int. Cl.
*H04N 19/139* (2014.01)
*H04N 19/105* (2014.01)
(Continued)

(52) U.S. Cl.
CPC ......... *H04N 19/139* (2014.11); *H04N 19/105* (2014.11); *H04N 19/159* (2014.11); *H04N 19/176* (2014.11)

(58) Field of Classification Search
None
See application file for complete search history.

(56) References Cited

U.S. PATENT DOCUMENTS

| 10,609,402 B2 | 3/2020 | Zhao et al. |
| 10,694,181 B2 | 6/2020 | Zhang et al. |

(Continued)

FOREIGN PATENT DOCUMENTS

| KR | 20190042090 A | 4/2019 |
| KR | 20190053257 A | 5/2019 |

(Continued)

OTHER PUBLICATIONS

International Search Report cited in corresponding international patent application No. PCT/KR2021/017286; Feb. 23, 2022; 5 pp.

*Primary Examiner* — Edemio Navas, Jr.
(74) *Attorney, Agent, or Firm* — Lempia Summerfield Katz LLC

(57) ABSTRACT

A video decoding method is disclosed for decoding a current block by using intra-prediction. The method includes: decoding related information including an intra-prediction mode of the current block from a bitstream; depending on the presence or absence of a reference sample at a position to be referenced in a first prediction direction indicated by an intra-prediction mode, determining a direction for the intra-prediction in consideration of a second prediction direction (Continued)

different than the first prediction direction; generating a prediction block of the current block by performing the intra-prediction according to the direction for the intra-prediction; reconstructing a residual block of the current block from the bitstream; and reconstructing the current block by adding the prediction block and the residual block.

17 Claims, 13 Drawing Sheets

(51) Int. Cl.
*H04N 19/159* (2014.01)
*H04N 19/176* (2014.01)

(56) References Cited

U.S. PATENT DOCUMENTS

| | | |
|---|---|---|
| 10,834,387 B2 | 11/2020 | Racape et al. |
| 11,259,039 B2 | 2/2022 | Zhao et al. |
| 11,363,254 B2 | 6/2022 | Racape et al. |
| 2018/0220130 A1* | 8/2018 | Zhang ............... H04N 19/86 |
| 2019/0273918 A1 | 9/2019 | Racape et al. |
| 2019/0342568 A1 | 11/2019 | Zhao et al. |
| 2020/0020134 A1* | 1/2020 | Tsukuba ............ H04N 19/159 |
| 2020/0036985 A1 | 1/2020 | Jang et al. |
| 2020/0195949 A1 | 6/2020 | Zhao et al. |
| 2020/0366895 A1* | 11/2020 | De Luxán Hernández et al. ........ H04N 19/12 |
| 2020/0413041 A1* | 12/2020 | Racape ............. H04N 19/182 |
| 2021/0044808 A1* | 2/2021 | Kim ................. H04N 19/70 |
| 2021/0136373 A1* | 5/2021 | De Luxán Hernández et al. ........ H04N 19/70 |
| 2021/0297656 A1* | 9/2021 | Ma ................. H04N 19/159 |
| 2021/0377516 A1* | 12/2021 | Rath ................ H04N 19/176 |
| 2022/0060728 A1 | 2/2022 | Zhao et al. |
| 2022/0312000 A1 | 9/2022 | Racape et al. |

FOREIGN PATENT DOCUMENTS

| | | |
|---|---|---|
| KR | 20190110548 A | 9/2019 |
| KR | 20200087088 A | 7/2020 |
| KR | 20200125724 A | 11/2020 |

* cited by examiner

VIDEO ENCODING AND DECODING METHOD USING ADAPTIVE REFERENCE PIXEL SELECTION

CROSS-REFERENCE TO RELATED APPLICATIONS

This application is a U.S. national stage of International Application No. PCT/KR2021/017286, filed on Nov. 23, 2021, which claims priority to Korean Patent Application No. 10-2020-0157795, filed on Nov. 23, 2020, and Korean Patent Application No. 10-2021-0161975 filed on Nov. 23, 2021, the entire contents of which are incorporated herein by reference.

TECHNICAL FIELD

The present disclosure relates to video encoding and decoding using adaptive reference pixel selection.

BACKGROUND

Since the volume of video data is larger than that of voice data or still image data, storing or transmitting video data without processing for compression requires a lot of hardware resources including memory.

Accordingly, when video data is stored or transmitted, the video data is generally compressed using an encoder so as to be stored or transmitted. Then, a decoder receives the compressed video data, and the decoder decompresses and reproduces the video data. Compression techniques for such video include H.264/AVC and High Efficiency Video Coding (HEVC), which improves coding efficiency over H.264/AVC by about 40%.

SUMMARY

Technical Problem

Because the size and resolution and frame rate of pictures constituting a video are increasing more and more, and thus the amount of data to be encoded is also increasing, it is desired to develop a new compression technology that has better encoding efficiency and greatly improves picture quality. In particular, there is a need for a compression technique that can encode pictures with a complex texture more efficiently, such as pictures containing edges (boundaries between objects) that vary in direction due to the presence of various objects.

The present disclosure relates to a method of selecting a reference sample when decoding in an intra-prediction mode. An aspect of the present disclosure is to provide an encoding and decoding method for adaptively resetting a reference sample according to the direction of a mode when an angle mode, which is one of the intra-prediction modes, is applied.

Technical Solution

An aspect of the present disclosure provides a video decoding method for decoding a current block by using intra-prediction. The method includes decoding related information including an intra-prediction mode of the current block from a bitstream. The method further includes determining, depending on the presence or absence of a reference sample at a position to be referenced in a first prediction direction indicated by an intra-prediction mode, a direction for the intra-prediction in consideration of a second prediction direction different than the first prediction direction. The method further includes performing the intra-prediction according to the direction for the intra-prediction to generate a prediction block of the current block, reconstructing a residual block of the current block from the bitstream, and adding the prediction block and the residual block to reconstruct the current block.

An aspect of the present disclosure provides a video encoding method for encoding a current block by using intra-prediction. The method includes determining an intra-prediction mode of the current block. The method further includes determining, depending on the presence or absence of a reference sample at a position to be referenced in a first prediction direction indicated by an intra-prediction mode, a direction for the intra-prediction in consideration of a second prediction direction different than the first prediction direction. The method further includes performing the intra-prediction according to the determined direction for the intra-prediction to generate a prediction block of the current block. The method further includes generating a residual block by subtracting the prediction block from the current block. The method further includes encoding information related to the intra-prediction mode and the residual block.

An aspect of the present disclosure provides a recording medium readable by a decoder. The recording medium stores a bitstream generated by a video encoding method. The video encoding method includes determining an intra-prediction mode of the current block. The video encoding method further includes determining, depending on the presence or absence of a reference sample at a position to be referenced as a first prediction direction indicated by an intra-prediction mode, a direction for the intra-prediction in consideration of a second prediction direction different than the first prediction direction. The video encoding method further includes performing the intra-prediction according to the direction for the intra-prediction to generate a prediction block of the current block. The video encoding method further includes generating a residual block by subtracting the prediction block from the current block. The video encoding method further includes encoding information related to the intra-prediction mode and the residual block.

Advantageous Effects

The present disclosure can enhance subjective picture quality as well as encoding efficiency by performing intra-prediction encoding and decoding in consideration of conditions such as the position of a block, the presence or absence of a reference sample, etc.

The present disclosure can enhance subjective picture quality as well as encoding efficiency by adaptively applying a prediction direction in order to reduce residual signals.

The present disclosure can enhance subjective picture quality as well as encoding efficiency by performing intra-prediction by using a prediction sample for minimizing residual signals according to a prediction direction and the presence or absence of a reference sample.

DETAILED DESCRIPTION

Figure 1:
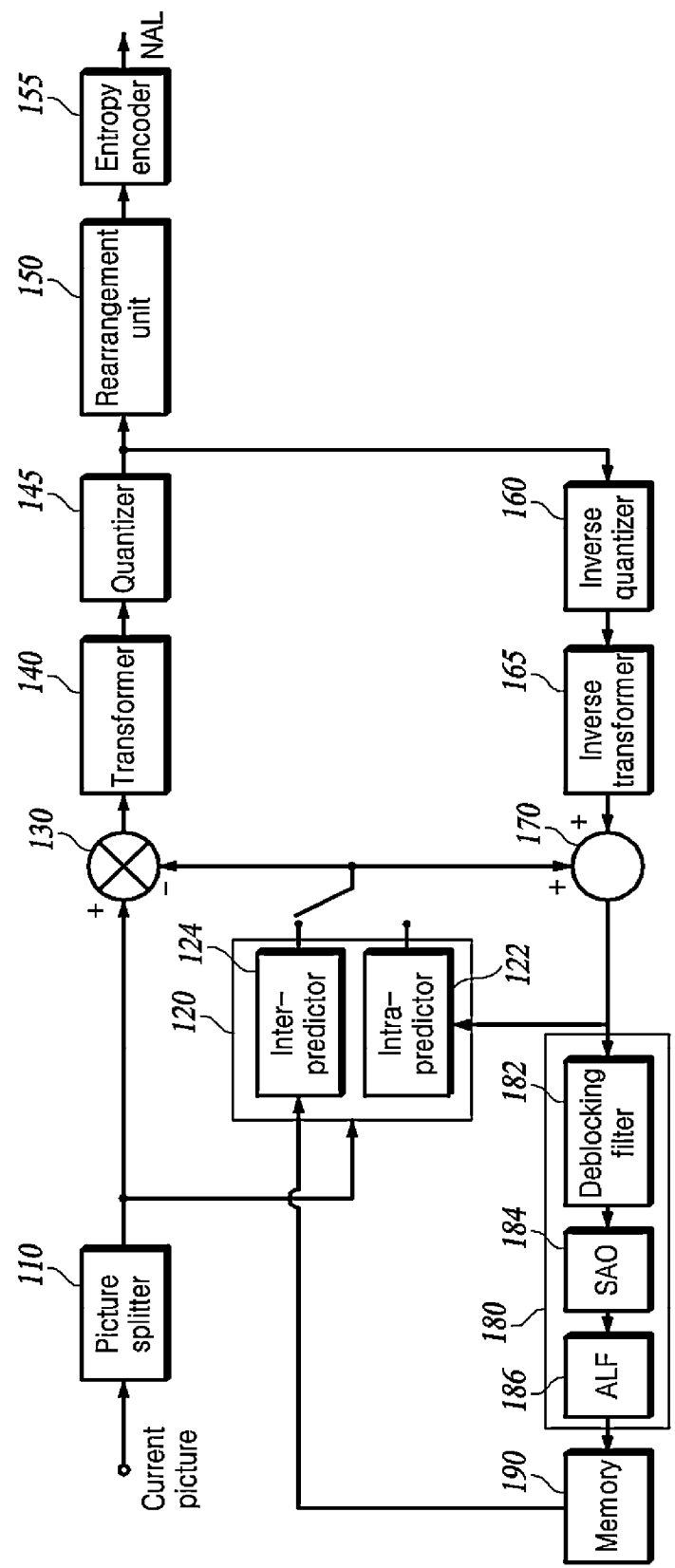
FIG. 1 is a block diagram of a video encoding apparatus according to an embodiment of the present disclosure.

Hereinafter, some embodiments of the present disclosure are described in detail with reference to the accompanying drawings. It should be noted that, in assigning reference numerals to the constituent elements in the respective drawings, like reference numerals designate like elements, although the elements are shown in different drawings. Further, in the following description of the present disclosure, a detailed description of known functions and configurations incorporated herein has been omitted to avoid obscuring the subject matter of the present disclosure.

FIG. 1 is a block diagram of a video encoding apparatus according to an embodiment of the present disclosure. Hereinafter, a video encoding apparatus 100 and its elements will be described with reference to FIG. 1.

The video encoding apparatus 100 may include a block splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each element of the video encoding apparatus may be implemented in hardware or software or implemented as a combination of hardware and software. The functions of the respective elements may be implemented as the software, and a microprocessor may be implemented to execute the software functions corresponding to the respective elements.

One video includes one or more sequences including a plurality of pictures. Each picture is split into a plurality of regions, and encoding is performed on each region. For example, one picture is split into one or more tiles and/or slices. The one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU.

In addition, information applied to all blocks in one slice in common is encoded as a syntax of a slice header, and information applied to all blocks constituting one or more pictures is encoded in a picture parameter set (PPS) or a picture header. Furthermore, information, which a sequence composed of a plurality of pictures refers to in common, is encoded in a sequence parameter set (SPS).

Information applied to one tile or tile group in common may be encoded as a syntax of a tile or tile group header. Syntaxes included in an SPS, a PPS, a slice header, and a tile or tile group header may be referred to as high-level syntaxes.

Additionally, a bitstream may include one or more adaptation parameter sets (APS) including parameters referenced by a picture or a pixel group smaller than the picture, for example, a slice. A picture header or a slice header includes an ID for identifying an APS used for a corresponding picture or slice. Pictures that refer to different PPS s or slices that refer to different picture headers may share the same parameters through the same APS ID.

Each of the plurality of pictures may be split into a plurality of subpictures that can be independently encoded/decoded and/or independently displayed. When subpicture splitting is applied, information on the layout of subpictures within a picture is signaled.

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting the video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size. The tree structure may also be a BinaryTree (BT), in which a node is split into two sub-nodes. The tree structure may also be a TernaryTree (TT), in which a node is split into three sub-nodes at a ratio of 1:2:1. The tree structure may also be a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. BTTT may be collectively referred to as a multiple-type tree (MTT).

Figure 2:
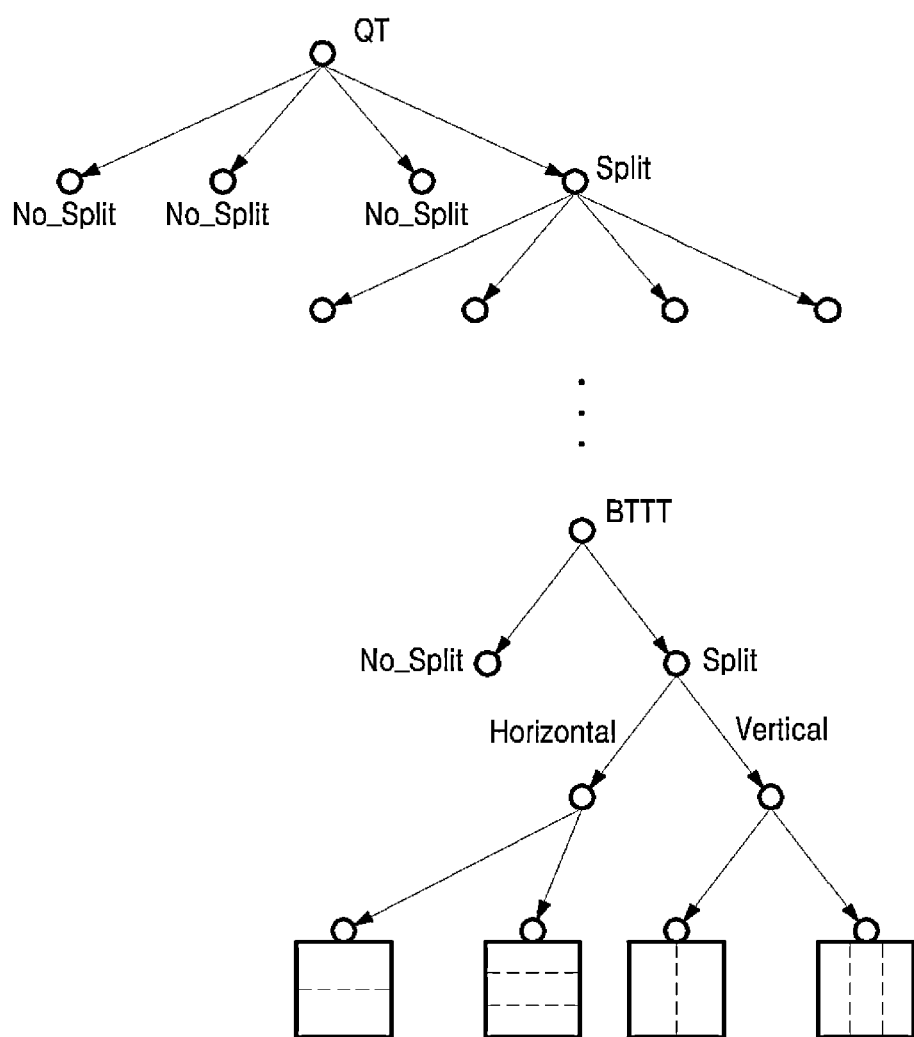
FIG. 2 is a view for explaining a method of splitting a block by using a quadtree plus binarytree ternarytree (QTBTTT) structure.

FIG. 2 is a view for explaining a method of splitting a block by using a QTBTTT structure.

As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is not larger than the maximum block size (MaxBTSize) of the root node allowed in the BT, the leaf node of the QT may be further split into one or more of the BT structure or the TT structure. The BT structure and/or the TT structure may have a plurality of splitting directions. For example, there may be two directions, namely, a direction in which a block of a node is horizontally split and a direction in which the block is vertically split. As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When a value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into blocks of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3 or include a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block". As QTBTTT splitting is employed, the shape of the current block may be square or rectangular.

The predictor 120 predicts the current block to generate a prediction block. The predictor 120 includes an intra-predictor 122 and an inter-predictor 124.

The intra-predictor 122 constructs reference samples from reconstructed samples positioned around the current block in the current picture including the current block and predicts samples in the current block using the reference pixels.

The intra-predictor 122 checks whether there is an available sample for each of positions to be referenced, in order to obtain reference samples to be used for prediction. If it is determined that there is no available sample for a position to be referenced, the intra-predictor 122 generates a reference sample by inserting a sample value in that position according to a predetermined method agreed upon between the video encoding apparatus and the video decoding apparatus and applying a filter.

Here, a reference sample refUnfilt[x][y] before application of a filter may be generated as in Table 1. Here, refIdx represents the index of a reference line, and refW and refH represent the width and height of a reference region, respectively.

TABLE 1

1) If all samples of refUnfilt[x][y] (with x = −1 − refIdx, y = −1 − refIdx..refH − 1 and x = − refIdx..refW − 1, y = −1 − refIdx) are not available as reference samples for intra-prediction, all values of refUnfilt[x][y] are set to 1 << (BitDepth − 1).
2) Otherwise, if only some refUnfilt[x][y] values are not available for intra-prediction, the following processes (a) ∼ (c) are applied.
    (a) If refUnfilt[−1 − refIdx][refH − 1] is not available as a reference sample, an available sample refUnfilt[x][y] is searched for, from x = −1 − refIdx, y = refH − 1 to x = −1 − refIdx, y = − 1−refIdx, and then a reference sample is searched for, from x = −refIdx, y = −1 − refIdx to x = refW − 1, y = −1 − refIdx. Once an available refUnfilt[x][y] is found, the search is finished and refUnfilt[−1 − refIdx][refH − 1] is set as refUnfilt[x][y].
    (b) If there is an unavailable sample for refUnfilt[x][y] in the range of x = −1 − refIdx, y = refH − 2..−1 − refIdx, refUnfilt[x][y] is set to refUnfilt[x][y+1].
    (c) If there is an unavailable sample for refUnfilt[x][y] in the range of x = −refIdx..refW − 1, y = −1 − refIdx, refUnfilt[x][y] is set to refUnfilt[x−1][y].

Figure 3:
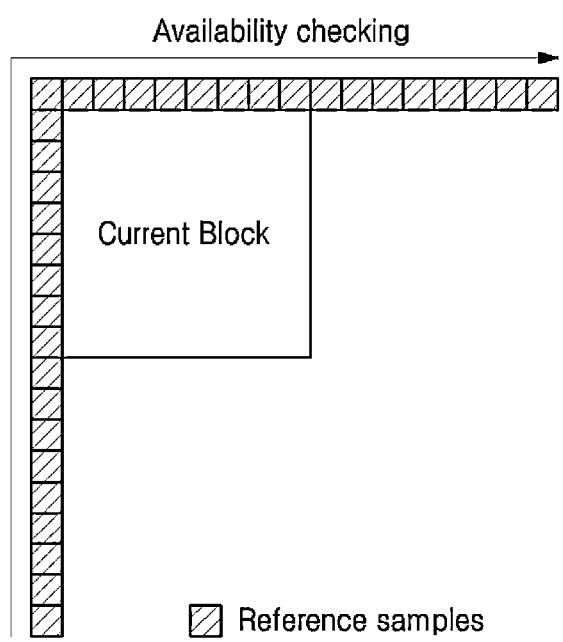
FIG. 3 is a view showing a plurality of intra-prediction modes.

FIG. 3 is a view illustrating a search order of reference samples.

As shown in the process (1) of Table 1 and FIG. 3, the intra-predictor 122 performs search in a clockwise direction, from the left lowermost reference sample of the current block to the top rightmost reference sample of the current block, in order to determine whether reference samples for prediction are available.

If a reference sample is not available for every reference sample position, the intra-predictor 122 rounds off half of the maximum allowed sample value and inserts it in the unavailable position as a reference sample value. In other words, for example, a reference sample value of 128 is inserted for a depth of 8 bits, and a reference sample value of 512 is inserted for a depth of 10 bits.

Figure 4:
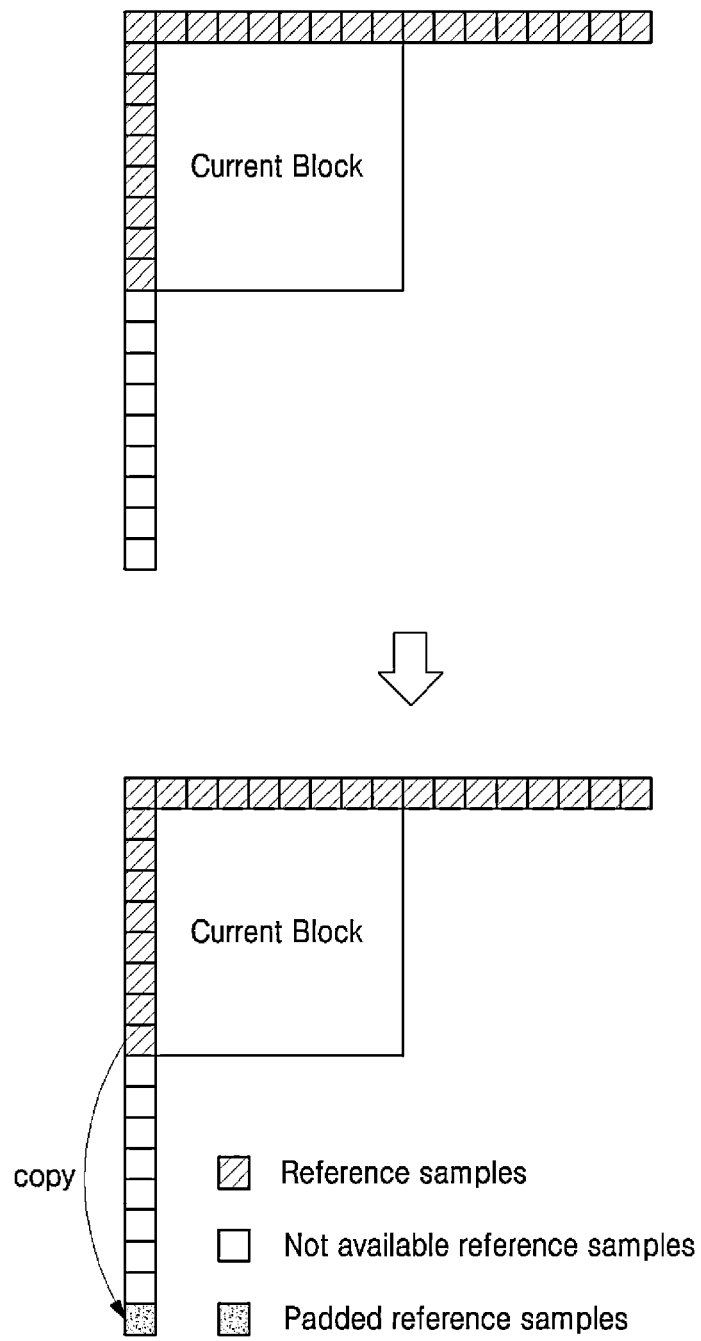
FIG. 4 is a view illustrating a method of generating a reference sample at the lowermost position.
Figure 5:
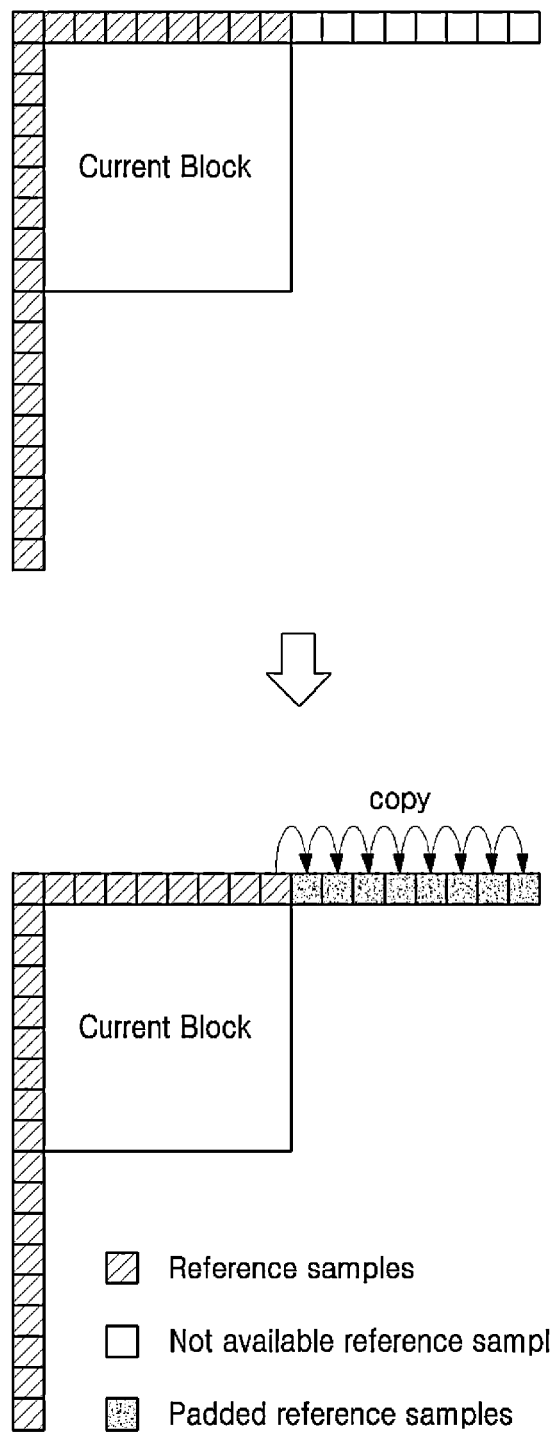
FIG. 5 is a view illustrating a method of generating a reference sample at a position other than the lowermost one.

FIG. 4 is a view illustrating a method of generating a reference sample at the lowermost position. FIG. 5 is a view illustrating a method of generating a reference sample at positions other than the lowermost one.

As illustrated in FIGS. 4 and 5, if a reference sample is not available at some reference sample positions, the intra-predictor 122 generates a reference sample for each of the unavailable positions in the method of (a) through (c) in Table 1.

As shown in FIG. 4, if a reference sample is not available at the left lowermost position, the intra-predictor 122 copies an available reference sample encountered first in the search order of FIG. 3 and inserts the available reference sample as a reference sample value at the left lowermost position.

If a reference sample at a position other than the left lowermost position is not available, the intra-predictor 122 copies a previously available reference sample value in the search direction and inserts the previously available reference sample value in the unavailable position as a reference sample value as shown in FIG. 5.

After generating reference samples at the top and left sides of the current block in this manner, the intra-predictor 122 may generate a final reference sample p[x][y] by applying a filter.

A method of generating the final reference sample p[x][y] is as shown in Table 2.

TABLE 2

If all of the following conditions are true, filterFlag is set to 1.
. refIdx (reference picture index) is 0
. nTbW * nTbH (size of current block) is larger than 32
. cIdx is 0 (that is, current block represents a luma signal)
. IntraSubPartitionsSplitType is equal to ISP_NO_SPLIT (this means that the current block is not split into sub partitions)
. refFilterFlag (a flag indicating whether to permit reference sample filtering or not) is 1
Otherwise, filterFlag is set to 0
If filterFlag is 1,
. p[−1][−1]
 = (refUnfilt[−1][0]+2*refUnfilt[−1][−1]+refUnfilt[0][−1]+2) >> 2
. p[−1][y]
 = (refUnfilt[−1][y+1]+2*refUnfilt[−1][y]+refUnfilt[−1][y−1]+2) >> 2,
  y=0..refH−2
. p[−1][refH−1] = refUnfilt[−1][refH−1]
. p[x][−1]
 = (refUnfilt[x−1][−1]+2*refUnfilt[x][−1]+refUnfilt[x+1][−1]+2) >> 2,
  x=0..refW−2
. p[refW−1][−1] = refUnfilt[refW−1][−1]
If filterFlag is 0, for x = −1−refIdx, y = −1−refIdx .. refH−1 and x = −refIdx .. refW−1, y = −1−refIdx,
. p[x][y] = refUnfilt[x][y]

Figure 6:
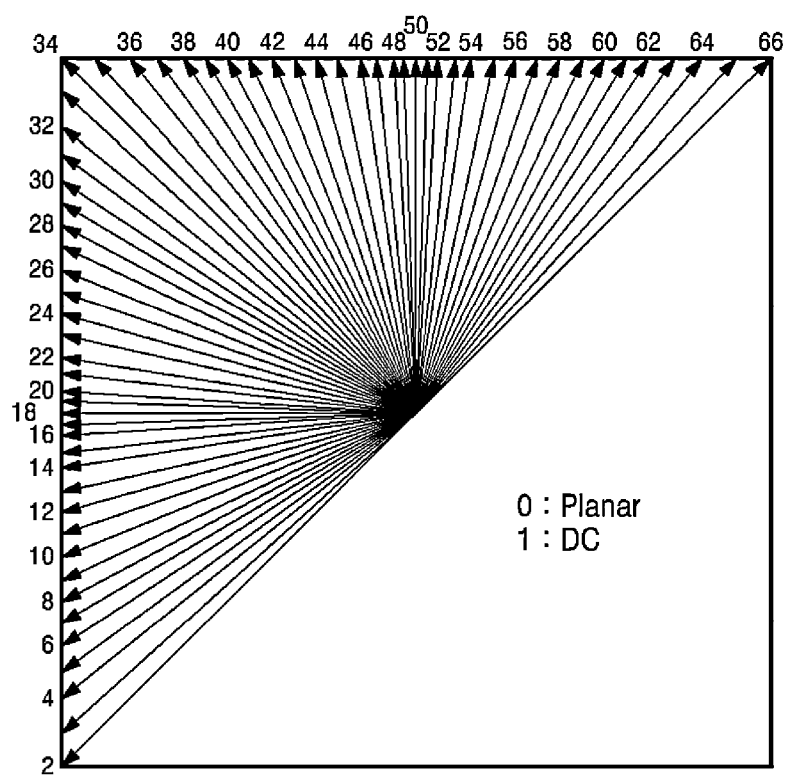
FIG. 6 is a view showing a plurality of intra-prediction modes.

FIG. 6 is a view showing a plurality of intra-prediction modes.

As shown in FIG. 6, there is a plurality of intra-prediction modes according to prediction directions. For example, the plurality of intra-prediction modes may include two non-directional modes, which include a planar mode and a DC mode, and 65 directional modes. Reference samples and an equation to be used are defined differently for each prediction mode.

The intra-predictor 122 generates reference samples in the above-described manner and performs intra-prediction for an intra-prediction using one of the intra-prediction modes.

Since prediction is performed in a per-block basis, a certain sample corresponding to a reference sample of the current block to be predicted may not have been reconstructed yet. Also, for a current block on a CTU boundary or on a picture boundary, there may be no reference sample due to various reasons including the absence of a reference sample. In this case, for a non-existent reference sample, the value of a neighboring reference sample may be used as a values of the non-existent reference sample.

The intra-predictor 122 determines an intra-prediction mode to be used in encoding the current block. The intra-predictor 122 may encode the current block using several intra-prediction modes and select an appropriate intra-prediction mode to use for the current block from the tested several modes. For example, the intra-predictor 122 may calculate rate-distortion values using rate-distortion analysis for the several tested intra-prediction modes and may select an intra-prediction mode that has the best rate-distortion characteristics among the tested modes.

The intra-predictor 122 selects one intra-prediction mode from among the plurality of intra-prediction modes and predicts the current block using reference samples and an equation determined according to the selected intra-prediction mode. Information about the selected intra-prediction mode is encoded by the entropy encoder 155 and transmitted to the video decoding apparatus.

Figure 7:
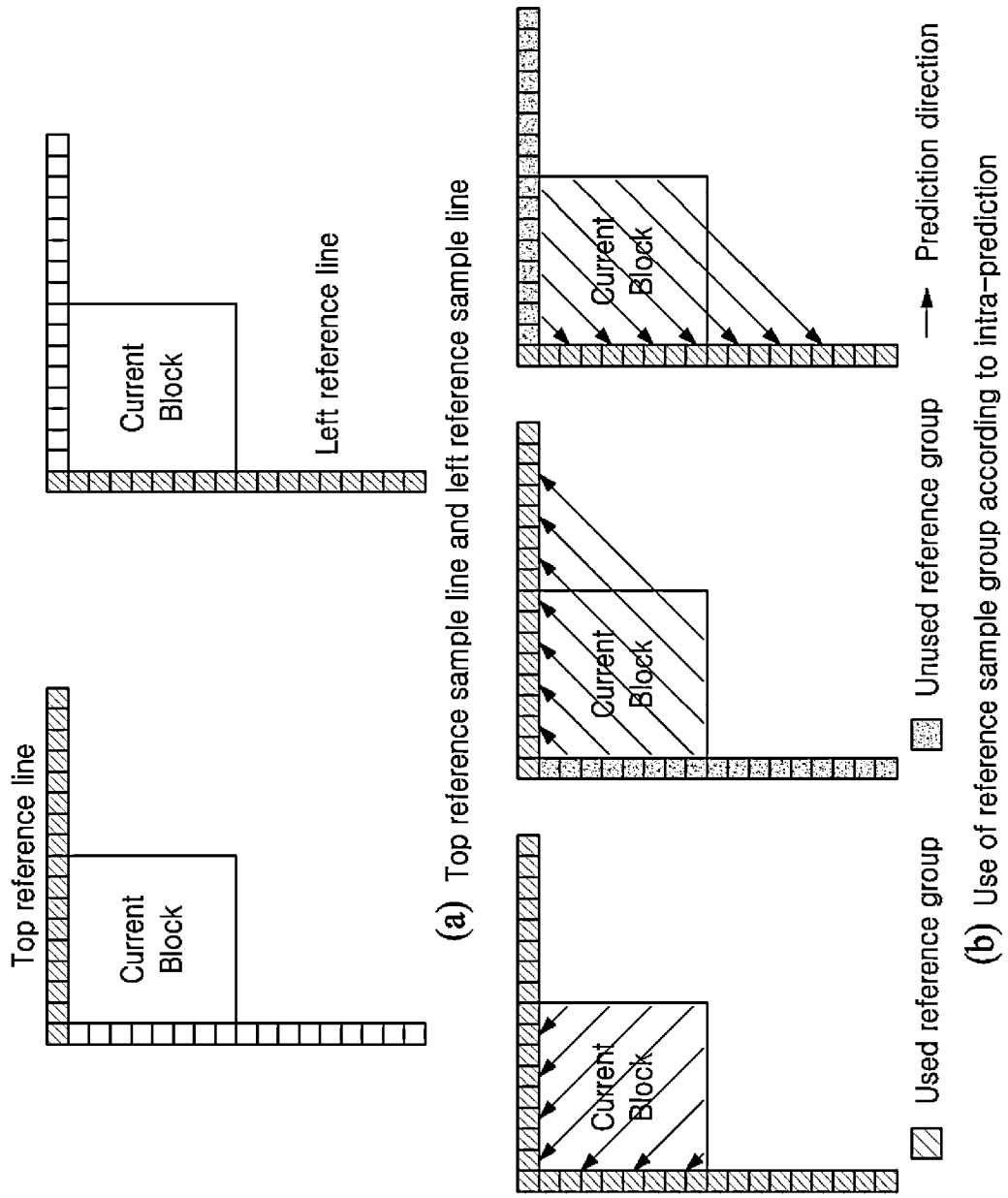
FIG. 7 includes view (a), which is a view showing reference samples of the current block grouped into a top reference line and a left reference line, and includes view (b), which is a view showing the use of a reference sample group according to an intra-prediction direction.

In FIG. 7, view (a) is a view showing reference samples of the current block grouped into a top reference line and a left reference line. In FIG. 7, view (b) is a view showing the use of a reference sample groups according to an intra-prediction direction.

An embodiment of the present disclosure discloses a technique in which, when samples at positions to be referenced are divided into two or more groups and intra-prediction is performed by using one group or two or more groups, as shown in FIG. 7, if intra-prediction using a particular reference sample group is not possible, intra-prediction is performed using one or more reference samples of another reference sample group.

Depending on the presence of an available reference sample at a sample position to be referenced in a specific prediction direction (hereinafter, "first prediction direction") indicated by an intra-prediction mode, the intra-predictor 122 determines a direction for the intra-prediction in consideration of a prediction direction (hereinafter, "second prediction direction") different than the first prediction direction.

Here, a description is given on the assumption that from among a reference sample group on the top of the current block (hereinafter, "first reference sample group") and a reference sample group on the left of the current block (hereinafter, "second reference sample group"), a first reference sample group is referenced for the first prediction direction. However, this is also applicable when the second reference sample group is referenced for the first prediction direction and when both of the first reference sample group and the second reference sample group are referenced for the first prediction direction.

Moreover, the second prediction direction may be the opposite direction of the first prediction direction but is not necessarily limited to this. The second prediction direction may be preset or calculated in a preset manner for each first direction corresponding to each intra-prediction mode.

If there are reference samples at every position to be referenced in the first prediction direction, the second prediction direction for the corresponding intra-prediction mode is not taken into consideration. If there is no available sample for at least one of positions to be referenced in the first prediction direction, the second prediction direction for the corresponding intra-prediction mode is taken into consideration and one of the first and second prediction directions is determined as a direction for the intra-prediction.

The second prediction direction is selected when the second reference sample group corresponds to any of the following four cases:

(1) A group in which there are samples at all positions to be referenced
(2) A group having the largest number of reference samples
(3) A group having the highest proportion of reference samples
(4) A group that does not include picture boundary or slice boundary If there is no reference sample at at least some positions to be referenced in the first prediction direction, intra-prediction for the current block may be performed in the second direction by using the second reference sample group.

Moreover, if the number of reference samples available for positions to be referenced in the first prediction direction is larger than the number of reference samples available for positions to be referenced in the second prediction direction, intra-prediction for the current block may be performed in the second direction by using the second reference sample group.

Furthermore, if the proportion of reference samples in the first reference sample group that are available for positions to be referenced in the first prediction direction is higher than the proportion of reference samples in the second reference sample group that are available for positions to be referenced in the second prediction direction, intra-prediction for the current block is performed in the second prediction direction by using the second reference sample group.

Figure 8:
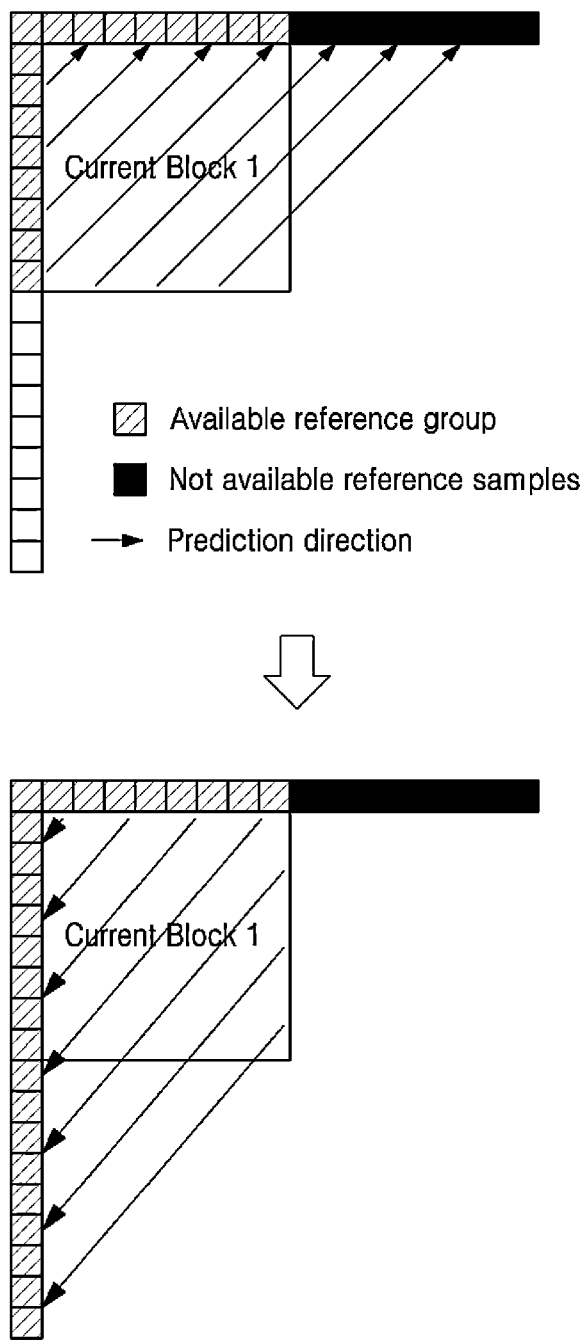
FIG. 8 is a view showing a case in which part of the first reference sample group is not available for reference and the entire second reference sample group is available for reference.

FIG. 8 shows a case in which part of the first reference sample group is not available for reference and the entire second reference sample group is available for reference.

In FIG. 8, if the first prediction direction corresponds to Mode No. 66 and the second prediction direction corresponds to Mode No. 2, about half samples of the first reference sample group are not available for reference for intra-prediction in the first prediction direction for the current block. In contrast, all samples of the second reference sample group are available for reference for intra-prediction in the second prediction direction for the current block. Accordingly, in this case, the intra-predictor 122 performs intra-prediction of the current block by determining the second prediction direction as the direction for the intra-prediction of the current block.

Figure 9:
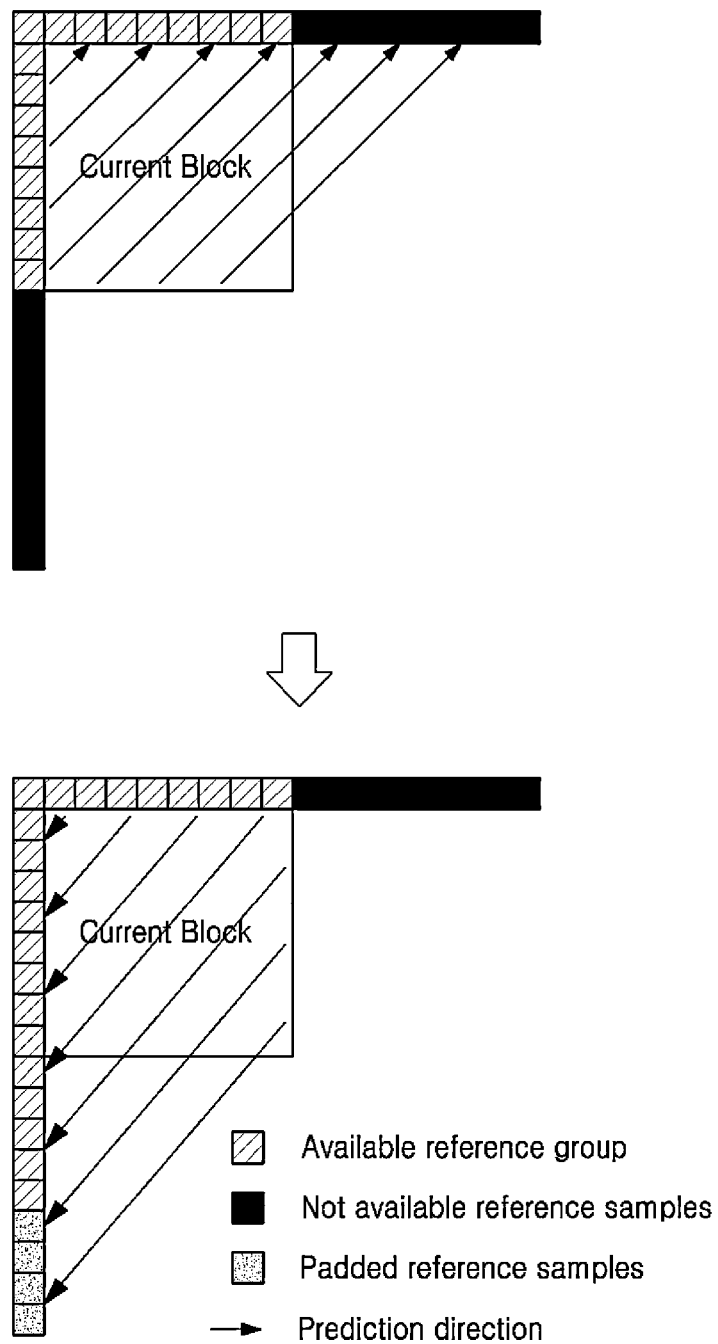
FIG. 9 is a view showing a case in which part of the first reference sample group and part of the second reference sample group are not available for reference.

FIG. 9 shows a case in which some samples of the first reference sample group are not available for reference and same samples of the second reference sample group are not available for reference.

As illustrated in FIG. 9, if the first prediction direction corresponds to Mode No. 66 and the second prediction direction corresponds to Mode No. 2, the proportion of reference samples in the second reference sample group that are available for reference for intra-prediction in the second prediction direction is higher than the proportion of reference samples in the first reference sample group that are available for reference for intra-prediction in the first prediction direction. Thus, intra-prediction for the current block is performed in the second prediction direction. For reference, the proportion of reference samples in the first reference sample group that are available for reference for intra-prediction in the first prediction direction is 1/2. The proportion of reference samples in the second reference sample group that are available for reference for intra-prediction in the second prediction direction is about 14/18.

Moreover, since the number of reference samples in the first reference sample group that are available for reference for intra-prediction in the second prediction direction is larger than the number of reference samples in the first reference sample group that are available for reference for intra-prediction in the first prediction direction, intra-prediction for the current block is performed in the second prediction direction. For reference, the number of reference samples in the first reference sample group that are available for reference for intra-prediction in the first prediction direction is 9. The number of reference samples in the second reference sample group that are available for reference for intra-prediction in the second prediction direction is 14.

In FIG. 9, the value of a reference sample in the second reference sample group that is not available for reference for intra-prediction in the second prediction direction is determined by using the values of other reference samples as explained with reference to FIGS. 4 and 5.

If the current intra-prediction mode is Mode No. 66, intra prediction is performed using the first reference sample group at the top alone. However, the first reference sample group is not available if the current block is positioned at the top of a CTU. Thus, if the second reference sample group is available, prediction is performed in the second prediction direction.

Moreover, if the current block is positioned on a CTU boundary, a picture boundary, or a slice boundary, the intra-predictor 122 determines the direction for intra-prediction in consideration of prediction in the first prediction direction and the second prediction direction.

Figure 10:
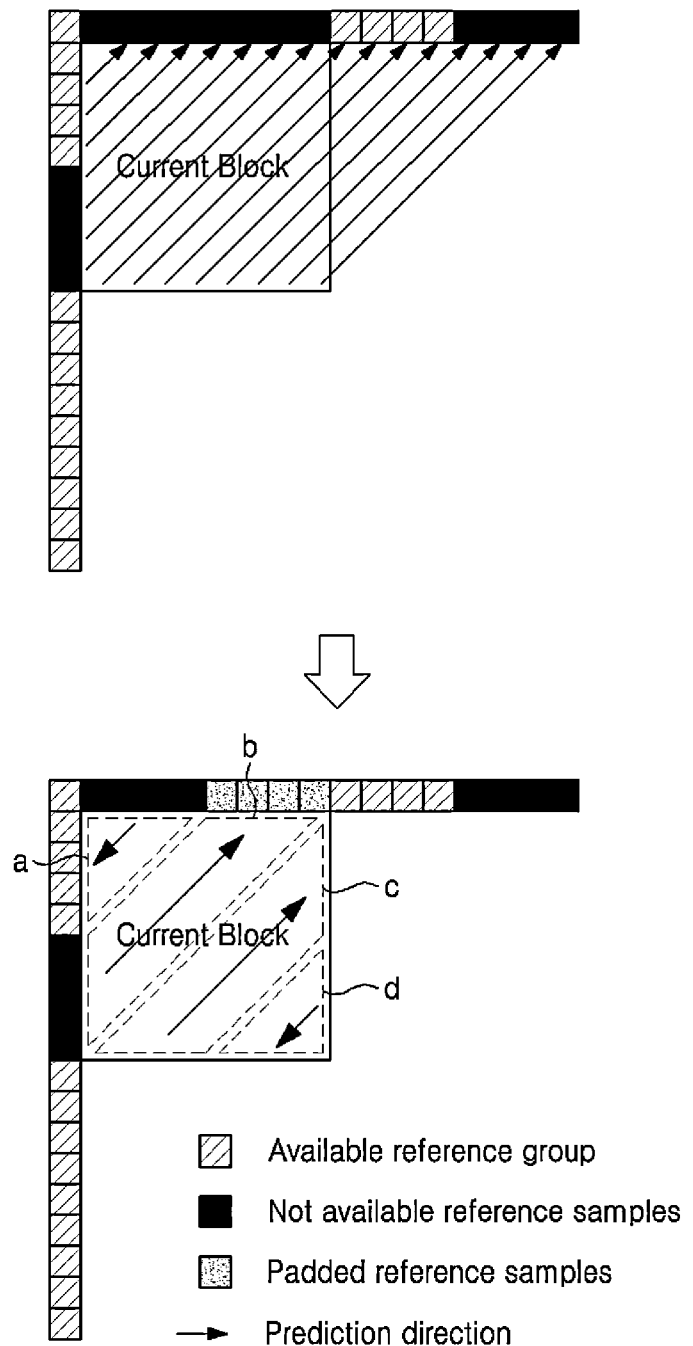
FIG. 10 is a view illustrating a case in which a current block is divided into regions and reference samples are selected for each region.

FIG. 10 illustrates a case in which a current block is divided into regions and reference samples are selected for each region.

As illustrated in FIG. 10, if part of the first reference sample group is not available for reference for intra-prediction in the first prediction direction, the current block is divided into a region (hereinafter, "first region") corresponding to available samples in the first reference sample group and a region (hereinafter, "second region") corresponding to unavailable samples in the first reference sample group. Likewise, the second region is subdivided into a third region, which has samples in the second reference sample group that are available for reference for intra-prediction in the second prediction direction, and a fourth region, which has no samples in the second reference sample group that are available for reference for intra-prediction in the second prediction direction.

In this case, intra-prediction of the first region and the fourth region is performed in the first prediction direction, and intra-prediction of the third region is performed in the second prediction direction. Meanwhile, the values of reference samples in the first reference sample group corresponding to the intra-prediction of the fourth region in the first prediction direction are determined using the values of other reference samples before intra-prediction of the fourth region is performed in the first prediction direction.

The boundaries of the plurality of regions are formed in parallel with the first prediction direction.

A concrete example is given in relation to FIG. 10. If an intra-prediction mode of the current block is No. 66, the current block may be split into several regions in Prediction Mode No. 66 due to the unavailability of reference samples when part of the first reference sample group and part of the second reference sample group do not exist.

In FIG. 10, reference samples available for prediction in relation to pixels present in Region "a" do not exist in the first reference sample group, but reference samples available for prediction exist in the second reference sample group. Thus, the intra-predictor 122 performs prediction of the pixels present in Region "a" in the second prediction direction by using the second reference sample group.

Reference samples available for prediction in relation to pixels present in Region "b" do not exist in corresponding positions of both of the first reference sample group and the second reference sample group. Thus, the intra-predictor 122 inserts a reference sample value determined using a neighboring reference sample into corresponding positions in the first reference sample group as shown in FIGS. 4 and 5 and performs prediction for the pixels present in Region "b" in the first prediction direction.

Reference may be made from the first reference sample group in the first prediction direction in relation to pixels present in Region "c". Thus, the intra-predictor 122 performs prediction of the pixels present in Region "c" in the first prediction direction by using the reference sample values of the first reference sample group.

Reference samples available for prediction in relation to pixels present in Region "d" do not exist in the first reference sample group, but reference samples available for prediction exist in the second reference sample group. Thus, the intra-predictor 122 performs prediction in the second prediction direction by using the second reference sample group.

Reference samples available for prediction in relation to pixels present in Region "d" do not exist in the first reference sample group, but reference samples available for prediction exist in the second reference sample group. Thus, the intra-predictor 122 performs prediction in the second prediction direction by using the second reference sample group.

The intra-predictor 122 may generate, as intra-prediction-related information, an ARS flag indicating whether to consider the second prediction direction based on the presence of a reference sample available for the first prediction direction indicated by an intra-prediction mode. Also, the intra-predictor 122 may send the ARS flag to the video decoding apparatus.

For example, if the ARS flag is 0, intra-prediction is performed in the first prediction direction indicated by the intra-prediction mode without consideration for the second prediction direction. If the ARS flag is 1, intra-prediction for the current block is performed in the first prediction direction or in the second prediction direction in consideration of the second prediction direction.

If the ARS flag is 1, additional information may be included in the intra-prediction-related information in performing intra-prediction for the current block in consideration of the second prediction direction. In other words, the additional information indicates whether to perform prediction in the first prediction direction or in the second prediction direction by dividing the current block into a plurality of regions depending on the availability of the first reference sample group and the second reference sample group.

The inter-predictor 124 generates a prediction block for the current block through motion compensation. Since details about the operation of the inter predictor 124 are out of scope of the present embodiment, a detailed description thereof has been omitted.

The subtractor 130 subtracts the prediction block generated by the intra-predictor 122 or the inter-predictor 124 from the current block to generate a residual block.

The transformer 140 may transform residual signals in a residual block. A two-dimensional size of the residual block may be used as a transform unit (hereinafter, "TU"), which is a block size for the transform. Alternatively, the residual block may be partitioned into a plurality of subblocks, and each subblock may be used as a TU to transform the residual signals within the corresponding subblock.

The transformer 140 may split the residual block into one or more subblocks and apply the transformation to the one or more subblocks. Thus, the residual values of the transform blocks may be transformed from the pixel domain to the frequency domain. In the frequency domain, the transformed blocks are referred to as coefficient blocks or transform blocks containing one or more transform coefficient values. A two-dimensional transform kernel may be used for transformation and one-dimensional transform kernels may be used for horizontal transformation and vertical transformation, respectively. The transform kernels may be based on a discrete cosine transform (DCT), a discrete sine transform (DST), or the like.

The transformer 140 may individually transform the residual block in a horizontal direction and a vertical direction. For transformation, various types of transform functions or transform matrices may be used. For example, a pair of transform functions for transformation in the horizontal direction and the vertical direction may be defined as a multiple transform set (MTS). The transformer 140 may select one transform function pair having the best transform efficiency in the MTS and transform the residual block in the horizontal and vertical directions, respectively. Information (mts_idx) on the transform function pair selected from the MTS is encoded by the entropy encoder 155 and signaled to the video decoding apparatus.

The quantizer 145 quantizes transform coefficients output from the transformer 140 using quantization parameters and outputs the quantized transform coefficients to the entropy encoder 155. For some blocks or frames, the quantizer 145 may directly quantize a related residual block without transformation. The quantizer 145 may apply different quantization coefficients (scaling values) according to positions of the transform coefficients in the transform block. A matrix of quantization coefficients applied to quantized transform coefficients arranged in two dimensions may be encoded and signaled to the video decoding apparatus.

The rearrangement unit 150 may rearrange the coefficient values for the quantized residual value. The rearrangement unit 150 may change the 2-dimensional array of coefficients into a 1-dimensional coefficient sequence through coefficient scanning. For example, the rearrangement unit 150 may scan coefficients from a DC coefficient to a coefficient in a high frequency region using a zig-zag scan or a diagonal scan to output a 1-dimensional coefficient sequence. Depending on the size of the transformation unit and the intra-prediction mode, a vertical scan in which a two-dimensional array of coefficients is scanned in a column direction or a horizontal scan in which two-dimensional block-shaped coefficients are scanned in a row direction may be used instead of the zig-zag scan. In other words, a scan mode to be used may be determined among the zig-zag scan, the diagonal scan, the vertical scan, and the horizontal scan according to the size of the transformation unit and the intra-prediction mode.

The entropy encoder 155 encodes the one-dimensional quantized transform coefficients output from the rearrangement unit 150 using various encoding techniques, such as Context-based Adaptive Binary Arithmetic Code (CABAC) and exponential Golomb, to generate a bitstream.

The entropy encoder 155 encodes information such as a CTU size, a CU split flag, a QT split flag, an MTT splitting type, and an MTT splitting direction, which are associated with block splitting, such that the video decoding apparatus may split the block in the same manner as in the video encoding apparatus. In addition, the entropy encoder 155 encodes information about a prediction type indicating whether the current block is encoded by intra-prediction or inter-prediction and encodes intra-prediction information (i.e., information about an intra-prediction mode) or inter-prediction information (information about a reference picture index and a motion vector) according to the prediction type. In addition, the entropy encoder 155 encodes information related to quantization, i.e., information on quantization parameters and information on a quantization matrix.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the prediction block generated by the predictor 120 to reconstruct the current block. The pixels in the reconstructed current block are used as reference pixels in performing intra-prediction of a next block.

The loop filter unit 180 filters the reconstructed pixels to reduce blocking artifacts, ringing artifacts, and blurring artifacts generated due to block-based prediction and trans-formation/quantization. The loop filter unit 180 may include one or more of a deblocking filter 182, a sample adaptive offset (SAO) filter 184, or an adaptive loop filter (ALF) 186.

The deblocking filter 182 filters a boundary between the reconstructed blocks to remove blocking artifacts caused by block-by-block coding/decoding, and the SAO filter 184 performs additional filtering on the deblocking-filtered video. The SAO filter 184 is a filter used to compensate for a difference between a reconstructed pixel and an original pixel caused by lossy coding and performs filtering in a manner of adding a corresponding offset to each reconstructed pixel. The ALF 186 performs filtering on a target pixel to be filtered by applying filter coefficients to the target pixel and neighboring pixels of the target pixel. The ALF 186 may divide the pixels included in a picture into predetermined groups and then may determine one filter to be applied to a corresponding group to differentially perform filtering on each group. Information about filter coefficients to be used for the ALF may be encoded and signaled to the video decoding apparatus.

The reconstructed blocks filtered through the loop filter unit 180 are stored in the memory 190. Once all blocks in one picture are reconstructed, the reconstructed picture may be used as a reference picture for inter-prediction of blocks in a picture to be encoded next.

Figure 11:
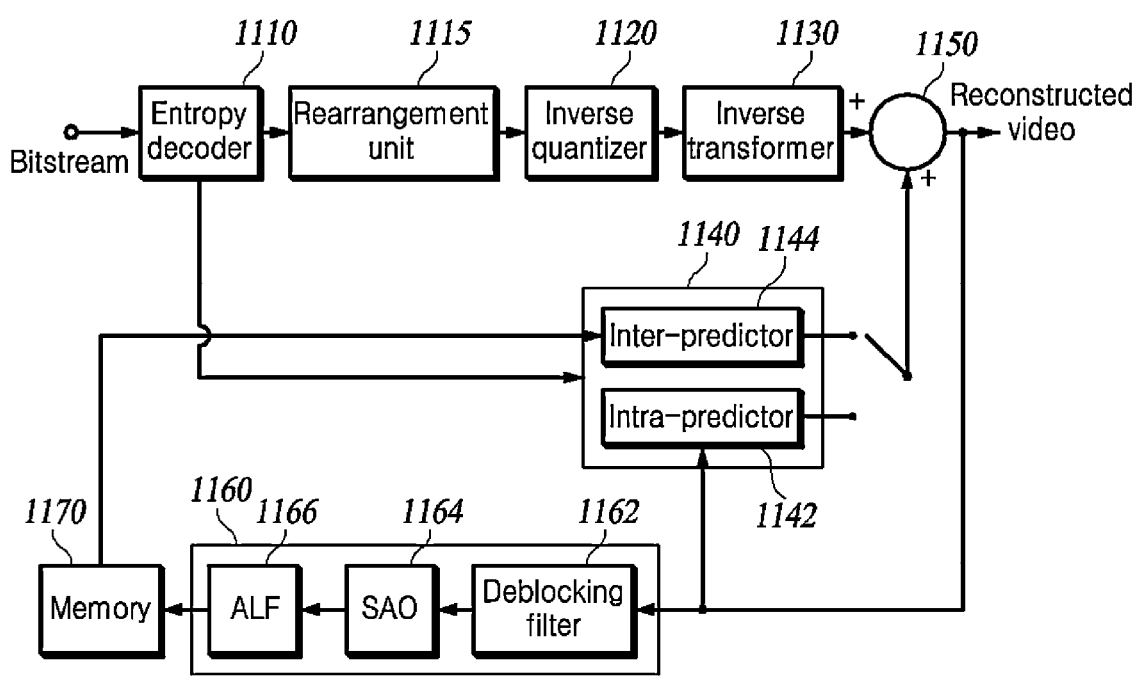
FIG. 11 is a block diagram of a video decoding apparatus according to an embodiment of the present disclosure.

FIG. 11 is a block diagram of a video decoding apparatus according to an aspect of the present disclosure. Hereinafter, the video decoding apparatus and elements of the apparatus are described with reference to FIG. 11.

The video decoding apparatus may include an entropy decoder 1110, a rearrangement unit 1115, an inverse quantizer 1120, an inverse transformer 1130, a predictor 1140, an adder 1150, a loop filter unit 1160, and a memory 1170.

Each element of the video decoding apparatus may be implemented in hardware, software or implemented as a combination of hardware and software. Further, the function of each element may be implemented in software, and the microprocessor may be implemented to execute the function of software corresponding to each element.

The entropy decoder 1110 determines a current block to be decoded by decoding a bitstream generated by the video encoding apparatus and extracting information related to block splitting. The entropy decoder 1110 also extracts prediction information, information about a residual signal, and the like required to reconstruct the current block.

The entropy decoder 1110 extracts information about the CTU size from the sequence parameter set (SPS) or the picture parameter set (PPS), determines the size of the CTU, and splits a picture into CTUs of the determined size. Then, the decoder determines the CTU as the uppermost layer, i.e., the root node of a tree structure, and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Each node below the leaf node of QT is thus recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may directly undergo MTT splitting without the QT splitting or may undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 1110 extracts information about a prediction type indicating whether the current block is intra-predicted or inter-predicted. When the prediction type information indicates intra-prediction, the entropy decoder 1110 extracts a syntax element for the intra-prediction information (intra-prediction mode) for the current block. When the prediction type information indicates inter-prediction, the entropy decoder 1110 extracts a syntax element for the inter-prediction information, i.e., information indicating a motion vector and a reference picture referred to by the motion vector.

The entropy decoder 1110 also extracts information about quantized transform coefficients of the current block as information related to quantization and information about residual signals.

The rearrangement unit 1115 may change the sequence of the one-dimensional quantized transform coefficients entropy-decoded by the entropy decoder 1110 to a 2-dimensional coefficient array (i.e., block) in a reverse order of the coefficient scanning performed by the video encoding apparatus.

The inverse quantizer 1120 inversely quantizes the quantized transform coefficients using the quantization parameter. The inverse quantizer 1120 may apply different quantization coefficients (scaling values) to the quantized transform coefficients arranged in two dimensions. The inverse quantizer 1120 may perform inverse quantization by applying a matrix of quantization coefficients (scaling values) from the video encoding apparatus to a two-dimensional array of quantized transform coefficients.

The inverse transformer 1130 inversely transforms the inversely quantized transform coefficients from the frequency domain to the spatial domain to reconstruct residual signals. A reconstructed residual block for the current block is thereby generated. In addition, when the MTS is applied, the inverse transformer 1130 determines transform functions or transform matrices to be applied in the horizontal and vertical directions, respectively, using the MTS information (mts_idx) signaled from the video encoding apparatus. The inverse transformer 1130 also uses the determined transform functions to inversely transform the transform coefficients in the transform block in the horizontal and vertical directions.

The predictor 1140 may include an intra-predictor 1142 and an inter-predictor 1144.

The intra-predictor 1142 is activated when the prediction type of the current block is intra-prediction, and the inter-predictor 1144 is activated when the prediction type of the current block is inter-prediction.

The intra-predictor 1142 determines an intra-prediction mode of the current block among a plurality of intra-prediction modes based on the syntax element for the intra-prediction mode extracted from the entropy decoder 1110 and predicts the current block using the reference pixels around the current block according to the intra-prediction mode.

The intra-predictor 1142 checks for the presence of an available sample for each of positions to be referenced, in order to obtain reference samples used for prediction. If it is determined that there is no available sample for the position to be referenced, the intra-predictor 1142 generates a reference sample by inserting a sample value into the position and applying a filter according to a predetermined method agreed between the video encoding apparatus and the video decoding apparatus.

Here, a reference sample refUnfilt[x][y] before application of a filter may be generated as in the process of Table 1. Here, refIdx represents the index of a reference line, and refW and refH represent the width and height of a reference region, respectively.

As shown in step (1) of Table 1 and FIG. 3, the intra-predictor 1142 performs search in a clockwise direction, from the left lowermost reference sample of the current block to the top rightmost reference sample of the current block, in order to determine whether reference samples for prediction are available.

If a reference sample is not available for every reference sample position, the intra-predictor 1142 rounds off half of the maximum allowed sample value and inserts it in the unavailable position as a reference sample value. In other words, for example, the intra-predictor 1142 inserts a reference sample value of 128 for a depth of 8 bits and a reference sample value of 512 for a depth of 10 bits.

As illustrated in FIGS. 4 and 5, if a reference sample is not available at some reference sample positions, the intra-predictor 1142 generates a reference sample for each of the unavailable positions in the method of (a) through (c) in Table 1.

As shown in FIG. 4, if a reference sample is not available at the left lowermost position, the intra-predictor 1142 copies an available reference sample encountered first in the search order of FIG. 3 and inserts the available reference sample as a reference sample value at the left lowermost position.

If a reference sample at a position other than the left lowermost position is not available, the intra-predictor 1142 copies a previously available reference sample value in the search direction and inserts the previously available reference sample value in the unavailable position as a reference sample value as shown in FIG. 5.

After generating reference samples at the top and left sides of the current block in this manner, the intra-predictor 1142 may generate a final reference sample p[x][y] by applying a filter.

A method of generating the final reference sample p[x][y] is as shown in Table 2.

As shown in FIG. 6, there is a plurality of intra-prediction modes according to a prediction direction. For example, the plurality of intra-prediction modes may include two non-directional modes, which include a planar mode and a DC mode, and may include 65 directional modes. Reference samples and an equation to be used are defined differently for each prediction mode.

The intra-predictor 1142 generates reference samples in the above-described manner and performs intra-prediction for an intra-prediction using one of the intra-prediction modes.

Since prediction is performed in a per-block basis, a certain sample corresponding to a reference sample of the current block to be predicted may not have been reconstructed yet. Also, for a current block on a CTU boundary or on a picture boundary, there may be no reference sample due to various reasons including the absence of a reference sample. In this case, for a non-existent reference sample, the value of a neighboring reference sample may be used as a value of the non-existent reference sample.

The intra-predictor 1142 determines or selects one of the plurality of intra-prediction modes based on intra-prediction-related information decoded from a bitstream and predicts the current block by using the reference samples and equation determined according to the selected intra-prediction mode.

The intra-predictor 1142 divides samples at positions to be referenced into two or more groups as shown in FIG. 7, and intra-prediction is performed by using one group or two or more groups. In this case, if intra-prediction using a particular reference sample group is not possible, the intra-predictor 1142 performs intra-prediction using one or more reference samples of another reference sample group.

Depending on the presence of an available reference sample at a sample position to be referenced in a specific prediction direction (hereinafter, "first prediction direction") indicated by an intra-prediction mode, the intra-predictor 1142 determines a direction for intra-prediction in consideration of a prediction direction (hereinafter, "second prediction direction") different than the first prediction direction.

Here, a description is given on the assumption that from among a reference sample group on the top of the current block (hereinafter, "first reference sample group") and a reference sample group on the left of the current block (hereinafter, "second reference sample group"), a first reference sample group is referenced for the first prediction direction. However, this is also applicable when the second reference sample group is referenced for the first prediction direction and when both of the first reference sample group and the second reference sample group are referenced for the first prediction direction.

Moreover, the second prediction direction may be the opposite direction of the first prediction direction but is not necessarily limited to this. The second prediction direction may be preset or calculated in a preset manner for each first direction corresponding to each intra-prediction mode.

If there are reference samples at every position to be referenced in the first prediction direction, the second prediction direction for the corresponding intra-prediction mode is not taken into consideration. If there is no available sample for at least one of positions to be referenced in the first prediction direction, the second prediction direction for the corresponding intra-prediction mode is taken into consideration and one of the first and second prediction directions is determined as a direction for the intra-prediction.

The second prediction direction is selected when the second reference sample group corresponds to any of the following four cases:
(a) A group in which there are samples at all positions to be referenced
(b) A group having the largest number of reference samples
(c) A group having the highest proportion of reference samples
(d) A group that includes no picture or slice boundary If there is no reference sample at at least one position to be referenced in the first prediction direction, intra-prediction for the current block may be performed in the second direction by using the second reference sample group.

Moreover, if the number of reference samples available for positions to be referenced in the first prediction direction is larger than the number of reference samples available for positions to be referenced in the second prediction direction, intra-prediction for the current block may be performed in the second direction by using the second reference sample group.

Furthermore, if the proportion of reference samples in the first reference sample group that are available for positions to be referenced in the first prediction direction is higher than the proportion of reference samples in the second reference sample group that are available for positions to be referenced in the second prediction direction, intra-prediction for the current block is performed in the second prediction direction by using the second reference sample group.

In FIG. 8, if the first prediction direction corresponds to Mode No. 66 and the second prediction direction corresponds to Mode No. 2, about half samples of the first reference sample group is not available for reference for intra-prediction in the first prediction direction for the current block, whereas all samples of the second reference sample group is available for reference for intra-prediction in the second prediction direction for the current block. Accordingly, in this case, the intra-predictor 1142 performs intra-prediction of the current block by determining the second prediction direction as the direction for the intra-prediction of the current block.

As illustrated in FIG. 9, if the first prediction direction corresponds to Mode No. 66 and the second prediction direction corresponds to Mode No. 2, the proportion of reference samples in the second reference sample group that are available for reference for intra-prediction in the second prediction direction is higher than the proportion of reference samples in the first reference sample group that are available for reference for intra-prediction in the first prediction direction. Thus, the intra-predictor 1142 performs intra-prediction for the current block in the second prediction direction. For reference, the proportion of reference samples in the first reference sample group that are available for reference for intra-prediction in the first prediction direction is 1/2. The proportion of reference samples in the second reference sample group that are available for reference for intra-prediction in the second prediction direction is about 14/18.

Moreover, since the number of reference samples in the first reference sample group that are available for reference for intra-prediction in the second prediction direction is larger than the number of reference samples in the first reference sample group that are available for reference for intra-prediction in the first prediction direction, the intra-predictor 1142 performs intra-prediction for the current block in the second prediction direction. For reference, the number of reference samples in the first reference sample group that are available for reference for intra-prediction in the first prediction direction is 9. The number of reference samples in the second reference sample group that are available for reference for intra-prediction in the second prediction direction is 14.

In FIG. 9, the value of a reference sample in the second reference sample group that is not available for reference for intra-prediction in the second prediction direction is determined by using the values of other reference samples as explained with reference to FIGS. 4 and 5.

If the current intra-prediction mode is Mode No. 66, intra prediction is performed using the first reference sample group at the top alone. However, the first reference sample group is not available if the current block is positioned at the top of a CTU. Thus, if the second reference sample group is available, prediction is performed in the second prediction direction.

Moreover, if the current block is positioned on a CTU boundary, a picture boundary, or a slice boundary, the intra-predictor 1142 determines the direction for intra-prediction in consideration of prediction in the first prediction direction and the second prediction direction. In other words, if the current block is positioned on a CTU boundary, a picture boundary, or a slice boundary, it may be impossible to perform intra-prediction for the current block by using a reference sample group of a neighboring CTU, a neighboring picture, or a neighboring slice.

As illustrated in FIG. 10, if part of the first reference sample group is not available for reference for intra-prediction in the first prediction direction, the current block is divided into a region (hereinafter, "first region") corresponding to available samples in the first reference sample group and a region (hereinafter, "second region") corresponding to unavailable samples in the first reference sample group. Likewise, the second region is subdivided into a third region, which has samples in the second reference sample group that are available for reference for intra-prediction in the second prediction direction, and a fourth region, which has no samples in the second reference sample group that are available for reference for intra-prediction in the second prediction direction.

In this case, the intra-predictor 1142 performs intra-prediction of the first region and the fourth region in the first prediction direction and performs intra-prediction of the third region in the second prediction direction. Meanwhile, the values of reference samples in the first reference sample group corresponding to the intra-prediction of the fourth region in the first prediction direction are determined using the values of other reference samples before intra-prediction of the fourth region is performed in the first prediction direction.

The boundaries of the plurality of regions are formed in parallel with the first prediction direction.

A concrete example will be given in relation to FIG. 10. If an intra-prediction mode of the current block is No. 66, the current block may be split into several regions in Prediction Mode No. 66 due to the unavailability of reference samples when part of the first reference sample group and part of the second reference sample group do not exist.

In FIG. 10, reference samples available for prediction in relation to pixels present in Region "a" do not exist in the first reference sample group, but reference samples available for prediction exist in the second reference sample group. Thus, the intra-predictor 1142 performs prediction of the pixels present in Region "a" in the second prediction direction by using the second reference sample group.

Reference samples available for prediction in relation to pixels present in Region b do not exist in corresponding positions of both of the first reference sample group and the second reference sample group. Thus, the intra-predictor 1142 inserts a reference sample value determined using a neighboring reference sample into corresponding positions in the first reference sample group as shown in FIGS. 4 and 5 and performs prediction for the pixels present in Region "b" in the first prediction direction.

Reference may be made from the first reference sample group in the first prediction direction in relation to pixels present in Region "c". Thus, the intra-predictor 1142 performs prediction of the pixels present in Region "c" in the first prediction direction by using the reference sample values of the first reference sample group.

Reference samples available for prediction in relation to pixels present in Region "d" do not exist in the first reference sample group, but reference samples available for prediction exist in the second reference sample group. Thus, the intra-predictor 1142 performs prediction in the second prediction direction by using the second reference sample group.

Reference samples available for prediction in relation to pixels present in Region "d" do not exist in the first reference sample group, but reference samples available for prediction exist in the second reference sample group. Thus, the intra-predictor 1142 performs prediction in the second prediction direction by using the second reference sample group.

The intra-predictor 1142 may extract, from intra-prediction-related information decoded from the bitstream, an ARS flag indicating whether to consider the second prediction direction based on the presence of a reference sample available for the first prediction direction indicated by an intra-prediction mode.

For example, if the ARS flag is 0, the intra-predictor 1142 performs intra-prediction in the first prediction direction indicated by the intra-prediction mode without consideration for the second prediction direction. If the ARS flag is 1, the intra-predictor 1142 performs intra-prediction for the current block in the first prediction direction or in the second prediction direction in consideration of the second prediction direction.

If the ARS flag is 1, additional information may be included in the intra-prediction-related information in performing intra-prediction for the current block in consideration of the second prediction direction. In other words, the additional information indicates whether to perform prediction in the first prediction direction or in the second prediction direction by dividing the current block into a plurality of regions depending on the availability of the first reference sample group and the second reference sample group.

The inter-predictor 1144 determines a motion vector of the current block and a reference picture to be referred by the motion vector based on a syntax element for an inter-prediction mode extracted from the entropy encoder 1110 and predicts the current block based on the motion vector and the reference picture.

The inter-predictor 1144 may perform interpolation filtering depending on the value of the motion vector of the current block. In other words, if a decimal part of the motion vector is not zero, the inter-predictor 1144 generates sub-samples indicated by the decimal part through interpolation. If a decimal part of a horizontal component (x component) of the motion vector is not zero, interpolation is performed horizontally. If a decimal part of a vertical component (y component) of the motion vector is not zero, interpolation is performed vertically.

The adder 1150 reconstructs the current block by adding a residual block outputted from the inverse transformer 1130 and the prediction block outputted from the inter-predictor 1144 or the intra-predictor 1142. The samples in the reconstructed current block are used as reference samples in performing intra-prediction of a block to be decoded later.

The loop filter unit 1160 may include at least one of a deblocking filter 1162, an SAO filter 1164, or an ALF 1166.

The deblocking filter 1162 performs deblocking filtering of the boundary between the reconstructed blocks to remove blocking artifacts caused by block-by-block decoding.

The SAO filter 1164 performs filtering in a manner of adding a corresponding offset to the reconstructed blocks after the deblocking filtering, so as to compensate for a difference between a reconstructed sample and an original sample caused by lossy coding.

The ALF 1166 performs filtering on a target sample to be filtered by applying filter coefficients to the target sample and neighboring samples of the target sample. The ALF 1166 may divide the samples included in a picture into predetermined groups and then may determine one filter to be applied to a corresponding group to differentially perform filtering on each group. The filter coefficients of the ALF 1166 are determined by using information about filter coefficients encoded from the bitstream.

The reconstructed blocks filtered through the loop filter unit 1160 are stored in the memory 1170. Once all blocks in one picture are reconstructed, the reconstructed picture may be used as a reference picture for inter-prediction of blocks in a picture to be encoded next.

Figure 12:
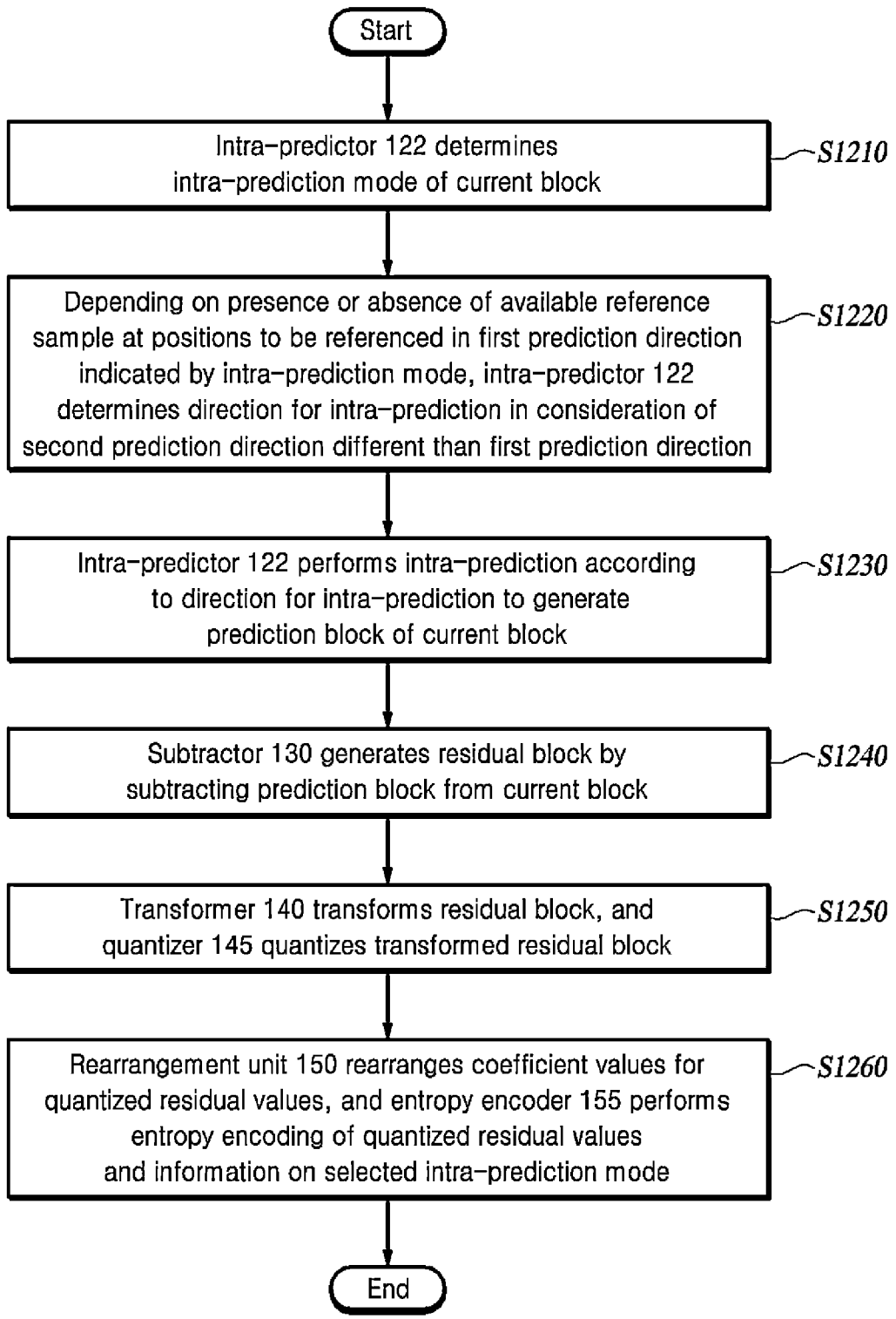
FIG. 12 is a flowchart for describing a video encoding method according to an embodiment of the present disclosure.

FIG. 12 is a flowchart of a video encoding method according to an embodiment of the present disclosure.

The intra-predictor 122 of the video encoding apparatus 100 determines an intra-prediction mode of the current block (S1210).

Depending on the presence or the absence of a reference sample at each of positions to be referenced in a prediction direction (hereinafter, "first prediction direction") indicated by an intra-prediction mode, the intra-predictor 122 determines a direction for the intra-prediction in consideration of a prediction direction (hereinafter, "second prediction direction") different than the first prediction direction (S1220).

The intra-predictor 122 generates a prediction block of the current block by performing intra-prediction according to the direction for the intra-prediction (S1230).

The subtractor 130 generates a residual block by subtracting the prediction block from the current block (S1240).

The transformer 140 transforms the residual block, and the quantizer 145 quantizes the transformed residual block (S1250).

The rearrangement unit 150 rearranges the coefficient values for the quantized residual values, and the entropy encoder 155 performs entropy encoding of the quantized residual values and intra-prediction-related information including the selected intra-prediction mode (S1260).

The steps S1210 through S1250 have been explained in full in the description of the video encoding apparatus 100, so further detailed description has been omitted.

Figure 13:
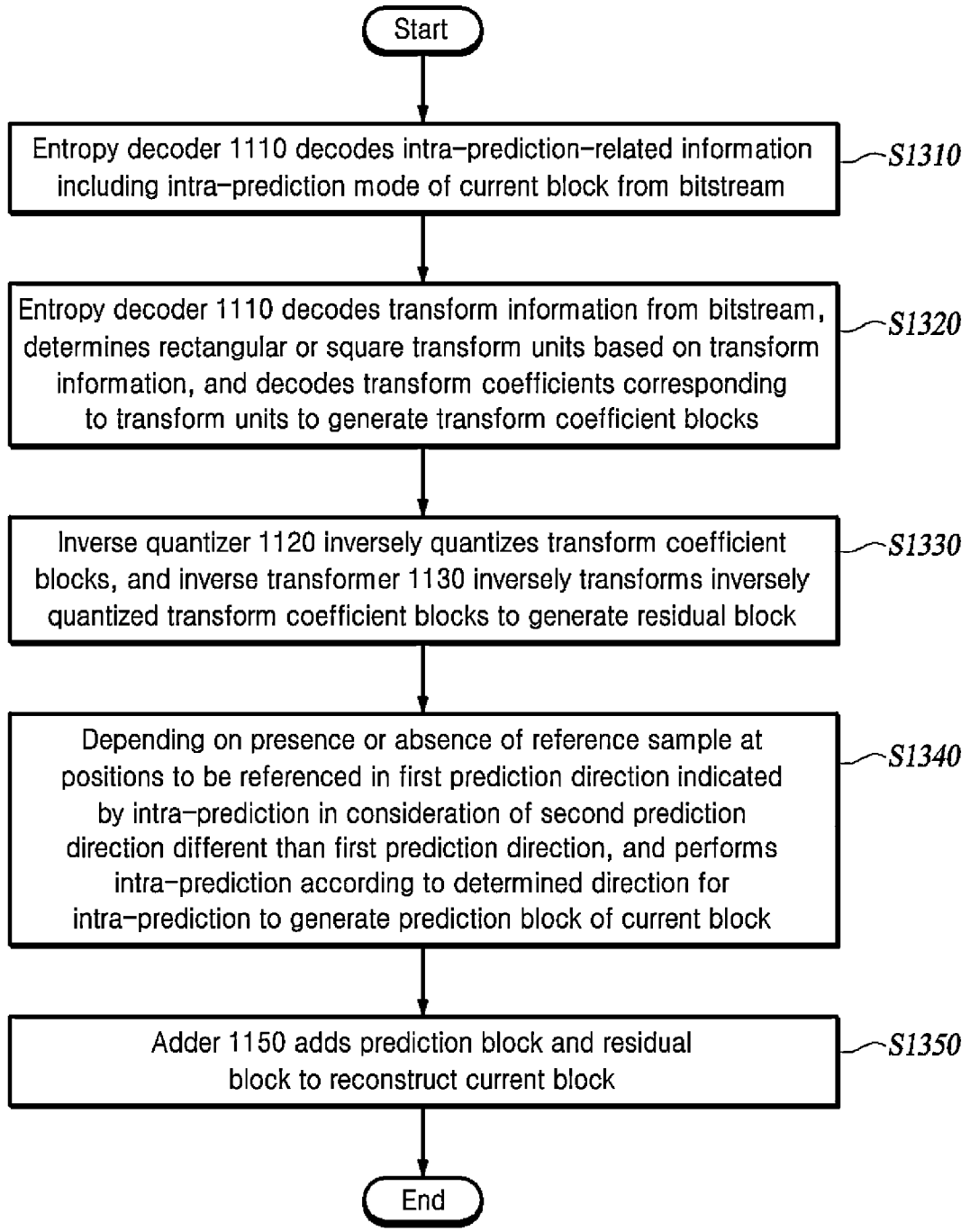
FIG. 13 is a flowchart for describing a video decoding method according to an embodiment of the present disclosure.

FIG. 13 is a flowchart of a video decoding method according to an embodiment of the present disclosure.

The entropy decoder 1110 of the video decoding apparatus 1100 decodes intra-prediction-related information including an intra-prediction mode of the current block from a bitstream (S1310).

The entropy decoder 1110 decodes transform information from the bitstream, determines rectangular or square transform units based on the transform information, and decodes transform coefficients corresponding to the transform units to generate transform coefficient blocks (S1320).

The inverse quantizer 1120 inversely quantizes the transform coefficient blocks, and the inverse transformer 1130 inversely transforms the inversely quantized transform coefficient blocks to generate a residual block (S1330).

Depending on the presence of a reference sample at a position to be referenced in a first prediction direction indicated by an intra-prediction mode, the intra-predictor 1142 determines a direction for the intra-prediction in consideration of a second prediction direction different than the first prediction direction and generates a prediction block of the current block by performing intra-prediction according to the determined direction for the intra-prediction (S1340).

The adder 1150 adds the prediction block and the residual block (S1350) to reconstruct the current block.

The steps S1310 through S1350 have been explained in full in the description of the video decoding apparatus 1100, so further detailed description has been omitted.

Meanwhile, various functions or methods of the present disclosure may be implemented as instructions stored in a non-transitory recording medium that may be read and executed by one or more processors. Non-transitory recording media include, for example, all types of recording devices in which data is stored in a form readable by a computer system. For example, the non-transitory recording medium includes storage media such as an erasable programmable read only memory (EPROM), a flash drive, an optical drive, a magnetic hard drive, and a solid state drive (SSD).

In the description above, it should be understood that the embodiments may be implemented in various other ways. Functions or methods described in one or more examples may be implemented in hardware, software, firmware, or any combination thereof. It should be understood that the functional components described in the present disclosure have been labeled by adding "unit" to the component name to particularly emphasize their implementation independence.

The above description merely illustrates the technical idea of the present disclosure, and those having ordinary skill in the art to which the present disclosure pertains may make various modifications and changes without departing from the essential characteristics of the present disclosure. Therefore, the embodiments disclosed in the present disclosure are not intended to limit the technical idea of the present disclosure but to describe the present disclosure, and the scope of the technical idea of the present disclosure is not limited thereto. The protection scope of the present disclosure should be interpreted by the claims, and all technical ideas within the equivalent scope should be interpreted as being included in the scope of the present disclosure.

| Explanation of Reference Numerals | |
|---|---|
| 100: Video encoding apparatus | 110: Block splitter |
| 120: Predictor | 122: Intra-predictor |
| 124: Inter-predictor | 130: Subtractor |
| 140: Transformer | 145: Quantizer |
| 150: Rearrangement unit | 155: Entropy encoder |
| 160: Inverse quantizer | 165: Inverse transformer |
| 170: Adder | 180: Loop filter unit |
| 182: Deblocking filter | 184: SAO |
| 186: ALF | 190: Memory |
| 1100: Video decoding apparatus | 1110: Entropy decoder |
| 1115: Rearrangement unit | 1120: Inverse quantizer |
| 1130: Inverse transformer | 140: Predictor |
| 1142: Intra-predictor | 1144: Inter-predictor |
| 1150: Adder | 1160: Loop filter unit |
| 1162: Deblocking filter | 1164: SAO |
| 1166: ALF | 1170: Memory |

What is claimed is:

1. A video decoding method for decoding a current block by using intra-prediction, the method comprising:
   decoding related information including an intra-prediction mode of the current block from a bitstream;
   depending on the presence or absence of a reference sample at a position to be referenced in a first prediction direction indicated by the intra-prediction mode, determining a direction for the intra-prediction in consideration of a second prediction direction different than the first prediction direction;
   performing the intra-prediction according to the direction for the intra-prediction to generate a prediction block of the current block;
   reconstructing a residual block of the current block from the bitstream; and
   adding the prediction block and the residual block to reconstruct the current block,
   wherein, in relation to either a first reference sample group on the top of the current block or a second reference sample group on the left of the current block, depending on whether part of one of the reference sample groups is unavailable for reference for intra-prediction in the first prediction direction, the current block is divided into a plurality of regions and the direction for intra-prediction for each region is selected between the first prediction direction and the second prediction direction.

2. The method of claim 1, wherein whether there is a reference sample at a position to be referenced in the first prediction direction is determined depending on the position of the current block.

3. The method of claim 1, wherein, when the first prediction direction is related to a prediction direction using either a first reference sample group on the top of the current block or a second reference sample group on the left of the current block, and when at least part of one of the reference sample groups is not available for reference, the intra-prediction is performed by using the other reference sample group which is either the first reference sample group or the second reference sample group.

4. The method of claim 1, wherein, in relation to either a first reference sample group on the top of the current block or a second reference sample group on the left of the current block, the intra-prediction is performed in the second prediction direction according to a result of comparison between the proportion of reference samples in one of the reference sample groups that are available for intra-prediction in the first prediction direction and the proportion of reference samples in the other reference sample group that are available for intra-prediction in the second prediction direction.

5. The method of claim 4, wherein the value of a reference sample in the other reference sample group that is not available for reference for intra-prediction in the second prediction direction is determined by using the values of other reference samples.

6. The method of claim 1, wherein, in relation to either a first reference sample group on the top of the current block or a second reference sample group on the left of the current block, the intra-prediction is performed in the second prediction direction depending on a result of comparison between the number of reference samples in one of the reference sample groups that are available for intra-prediction in the first prediction direction and the number of reference samples in the other reference sample group that are available for intra-prediction in the second prediction direction.

7. The method of claim 1, wherein the boundaries of the plurality of regions are in parallel with the first prediction direction.

8. The video decoding method of claim 1, wherein, for a region in which there are neither reference samples available for the first prediction direction nor reference samples available for the second prediction direction, the intra-prediction is performed in the first prediction direction.

9. The method of claim 1, wherein the related information includes an ARS flag, and wherein the ARS flag is information indicating to perform an operation of determining the second prediction direction based on the presence of an available reference sample.

10. The method of claim 1, wherein, when the current block is positioned on at least one of a CTU boundary, a picture boundary, or a slice boundary, the direction for intra-prediction is determined in consideration of prediction in the first prediction direction and the second prediction direction.

11. A method for encoding a current block by using intra-prediction, the method comprising:
    determining an intra-prediction mode of the current block;
    depending on the presence or absence of a reference sample at a position to be referenced in a first prediction direction indicated by the intra-prediction mode, determining a direction for the intra-prediction in consideration of a second prediction direction different than the first prediction direction;
    performing the intra-prediction according to the determined direction for the intra-prediction to generate a prediction block of the current block;
    generating a residual block by subtracting the prediction block from the current block; and
    encoding information related to the intra-prediction mode and the residual block,
    wherein, in relation to either a first reference sample group on the top of the current block or a second reference sample group on the left of the current block, depending on whether part of one of the reference sample groups is unavailable for reference for intra-prediction in the first prediction direction, the current block is divided into a plurality of regions and the direction for intra-prediction for each region is selected between the first prediction direction and the second prediction direction.

12. The method of claim 11, wherein, when the first prediction direction is related to a prediction direction using either a first reference sample group on the top of the current block or a second reference sample group on the left of the current block, and when at least part of one of the reference sample groups is not available for reference, the intra-prediction is performed by using the other reference sample group which is either the first reference sample group or the second reference sample group.

13. The method of claim 11, wherein, in relation to either a first reference sample group on the top of the current block or a second reference sample group on the left of the current block, the intra-prediction is performed in the second prediction direction according to a result of comparison between the proportion of reference samples in one of the reference sample groups that are available for intra-prediction in the first prediction direction and the proportion of reference samples in the other reference sample group that are available for intra-prediction in the second prediction direction.

14. The method of claim 11, wherein, in relation to either a first reference sample group on the top of the current block or a second reference sample group on the left of the current block, the intra-prediction is performed in the second prediction direction depending on a result of comparison between the number of reference samples in one of the reference sample groups that are available for intra-prediction in the first prediction direction and the number of reference samples in the other reference sample group that are available for intra-prediction in the second prediction direction.

15. The method of claim 11, wherein the boundaries of the plurality of regions are in parallel with the first prediction direction.

16. The method of claim 11, wherein, for a region in which there are neither reference samples available for the first prediction direction nor reference samples available for the second prediction direction, the intra-prediction is performed in the first prediction direction.

17. A method for providing video data to a video decoding device, the method comprising:
    encoding the video data into a bitstream; and
    transmitting the bitstream to the video decoding device,
    wherein encoding the video data comprises:
        determining an intra-prediction mode of the current block;
        depending on the presence or absence of a reference sample at a position to be referenced as a first prediction direction indicated by the intra-prediction mode, determining a direction for the intra-prediction in consideration of a second prediction direction different than the first prediction direction;
        performing the intra-prediction according to the direction for the intra-prediction to generate a prediction block of the current block;
        generating a residual block by subtracting the prediction block from the current block; and
        encoding information related to the intra-prediction mode and the residual block, and
    wherein, in relation to either a first reference sample group on the top of the current block or a second reference sample group on the left of the current block, depending on whether part of one of the reference sample groups is unavailable for reference for intra-prediction in the first prediction direction, the current block is divided into a plurality of regions and the direction for intra-prediction for each region is selected between the first prediction direction and the second prediction direction.

* * * * *